May 7, 1940.  R. BARTHELEMY  2,199,608
ELECTRONIC TELEVISION TRANSMITTER
Filed July 15, 1938
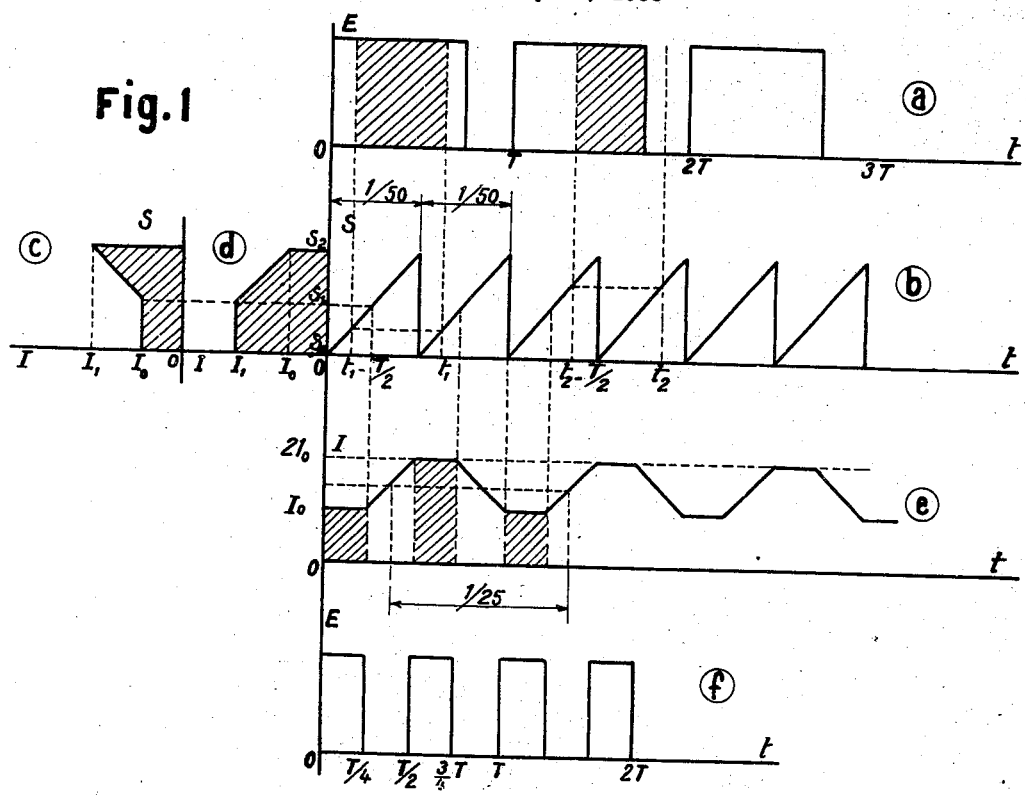
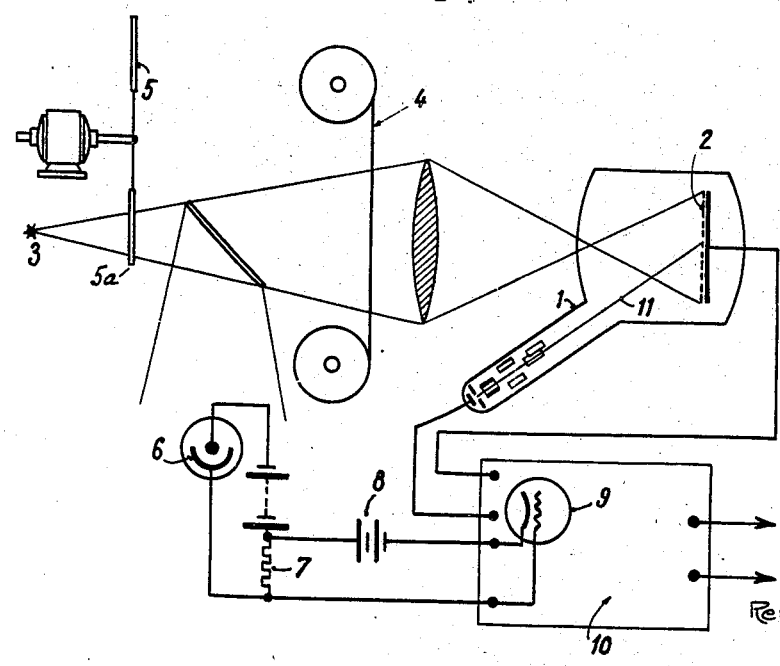
Fig.2
René Barthelemy
INVENTOR
By Otto Munk
his ATT'Y.

Patented May 7, 1940

2,199,608

UNITED STATES PATENT OFFICE 2,199,608

ELECTRONIC TELEVISION TRANSMITTER

René Barthelemy, Fontenay aux Roses, France, assignor to Compagnie pour la Fabrication des Compteurs et Materiel d'Usines a Gaz, Seine, France Application July 15, 1938, Serial No. 219,380
In France July 19, 1937

6 Claims. (Cl. 178—7.2)

It is known to form a telecinema transmitter by means of a member which unwinds the film to be transmitted in jerks for example at the usual frequency of 25 frames per second, and by means of a scanning member operating in the manner which is classical in television with a double sawtooth scanning, the slow frequency of which is 50 pps. for example. Each picture of the film is in that case scanned twice by the scanning member, in such a manner that the pictures transmitted are not marred by the defect of flicker which would have been inevitable if their renewal frequency had been 25 pps.

In particular, the scanning device in question may be of the electronic type with charge accumulation, wherein the scanning beam scans a granulated photo-sensitive surface forming a battery of condensers and discharges from each grain a quantity of electricity which is proportional to the amount of luminous energy received by said grain since the previous passing of the beam.

Now, as motion picture films are formed by a succession of separate pictures, in order to enable the scanning beam always to find homologous spots of the pictures at a given phase of the scanning period, it is necessary to conceal the film during its translation, i. e., during about one quarter of the period. It is usual to use for this purpose a shutter blade of suitable width which is rotated between the film and the scanner with a motion which is synchronous with the period of renewal of the pictures. This causes a disturbance in the operation of the scanning device of the above referred to type, the nature of which disturbance will be explained in detail hereinafter and which it is the object of the present invention to eliminate.

The present invention essentially consists in concealing the film at a frequency which is twice as great as the frequency of renewal of the pictures of the film, by means of a second shutter blade arranged symmetrically with respect to the first. The invention also includes accessory devices enabling the disturbances to be eliminated which are caused by the successive interruptions of the lighting of the photo-sensitive surface.

The nature of the invention and of the disturbances which it enables to be overcome are explained in the ensuing description taken with reference to the accompanying drawing in which:

Fig. 1 shows various diagrams relating to the scanning by means of a photo-sensitive surface.

Fig. 2 shows a device for eliminating the disturbances produced by the interruptions of the lighting of said photo-sensitive surface.

According to Fig. 1, the curve $a$ gives the illuminations of the photoelectric surface as a function of the time $t$ for a scene which is assumed to be uniformly white; it can be seen that E has a constant value between $kT$ and $(k+\frac{3}{4})T$, for about $\frac{3}{4}$ of the period T of renewal of the pictures of the film, and a zero value for the remainder of the period. In practice, the period T is $\frac{1}{25}$ of a second. The diagram $b$ shows, again as a function of the time, the ordinates $s$ of the lines scanned on the picture. At any instant $t_1$, the intensity of the photoelectric current of the accumulation scanning device is equal to the area between $t_1$ and $t_1-T/2$; said area is hatched in the diagram $a$. Two instants $t_1$ and $t_2$ have been chosen, which are respectively part of a first and of a second half-period. It can be seen that for said two instants the hatched area, and consequently the photoelectric current, does not have the same value. The diagrams $c$ and $d$ represent, as a function of $s$, the photoelectric currents I obtained as just explained, respectively for a first and a second half-period. It will thus be seen that the photo-electric current varies, during each half-period, between two values $I_0$ and $I_1$, $I_1$ being equal to $2I_0$ if the time of cut-off is $\frac{1}{4}$ period as has been assumed. Finally, the curves $c$ and $d$ have been shown end to end in the diagram $e$, in such a manner as to represent the variation of I as a function of the time.

If the diagrams $c$ and $d$ are again considered, it will be seen that the pciture of the uniform zone considered will be formed by two horizontal strips: one is formed by the lines included between $s_0$ and $s_1$ and has a flickering illumination at 25 pps. between the values $I_0$ and $2I_0$ (hatched areas of the curve $e$); the other strip is formed by the lines included between $s_1$ and $s_2$, and in this strip, the flicker effect is further complicated by a vignetting effect directed alternately upwards and downwards.

These two troublesome effects are eliminated, according to the invention, by means of an additional shutter blade which is diametrically opposite the picture change blade and which stops the scanning during the interval $T/4$ to $T/2$ of the period (diagram $f$). It is obvious that in this manner the two scannings of the period are effected under identical conditions and that the intensity of the photoelectric current, in the case which has been taken as an example, remains constantly equal to $I_0$.

The present invention may easily be extended to the case in which each picture of the film is scanned any number of times. It suffices in that case to stop the scanning as many times as each picture of the film is scanned and to give the shutter an equal number of blades.

However, experience has shown that this device had the drawback of dividing the picture, in the case studied, into two zones of slightly different mean shades. The study of this phenomenon revealed that it was due to the elimination of the illumination of the photoelectric surface during the scanning. The lightest strip observed is determined by the mean light during the illumination of the photoelectric surface, this function being moreover hatched at the periodicity of renewal of the pictures by the shutter blades. Under these conditions, the uniformity of shade it is desired to obtain can be produced by reducing the brilliance of the lighter strip. Various solutions have been proposed for this purpose.

The first consists in using the fact that the constant illumination of a point of the image is a linear function of the time of cut-off. As this latter depends, for each line, on the width of the blade for the corresponding value of the radius of the blade, it will suffice to give said blade a suitable contour in order to compensate the anomalies which may have been observed on a given strip of the picture.

Another method for restoring the evenness of illumination of the picture, consists in interposing, between the film and the scanning device, at the brightest parts, an optical filter of suitable opacity which may, if necessary, be composed of sections of different opacities.

Finally, a last solution consists in providing the photoelectric current with a correcting term which is proportional at each instant to the mean shade. For this purpose, use is made of an electric component proportional to the total luminous flux which falls on the photoelectric surface at a given instant, and which suitably biases the control grid of an amplifying tube, is applied on an auxiliary grid of a multielectrode tube, or acts on its plate circuit in known manner.

Fig. 2 shows diagrammatically the device according to the invention: an electronic emitter with accumulation 1, comprising amongst other members a mosaic 2 of photo-electric elements and a scanning beam 11, receives the luminous flux issuing from a source 3 and modulated by passing through the film to be transmitted 4, said flux being periodically interrupted by the blade 5 at instants corresponding to the changes of picture of the film.

A second shutter blade 5a, which is disposed diametrically opposite the picture change blade 5, interrupts the luminous flux in the middle of the interval separating two successive translations of the film. This results, as explained above, in the two scannings of the same image being effected under uniform conditions, whereby, e. g., the analysis of a uniformly white surface produces a constant current.

However, owing to the fact that one portion of the screen is scanned during the projection of the image, the picture produced at the receiver will be found to be divided into two zones of slightly different mean shades. In order to overcome this disadvantage, the blades 5 and 5a may be given suitable contours (not shown) whereby the zones producing a brighter image are illuminated for a shorter period, or a filter screen (not shown) may be inserted into the path of the luminous beam issuing from the source 3 to reduce the quantity of light falling onto the zone producing the brighter images.

A third method and device for obtaining the same effect are illustrated in Fig. 2.

A photoelectric cell 6, arranged in front of the blade 5, receives a flux which is proportional to the total luminous flux impinging on 2, assuming the transmission of light through the film 4 to be constant; the photo-electric current of the cell 6 therefore takes up a substantially castellated shape, taking up a constant value when the source is not cut off and a substantially zero value when the blade passes. Said current passes through a resistance 7 and produces a certain difference of potential across the terminals of the latter. According to a preferred embodiment of the invention, said castellated difference of potential is added to a fixed bias 8 in the cathode-grid circuit of the amplifier of the modulated picture current 10. The picture current subsequently varies according to whether or not the blade 5 conceals the flux issuing from 3, and is formed, with a suitable choice of the characteristics of the circuit, by superposing on the modulated signal a signal which is proportional to the mean shade, thereby enabling a uniform shade of picture to be obtained.

What I claim is:

1. A method for eliminating the flicker produced during the scanning, in a television transmitter, by means of a surface formed by a group of photo-electric elements and scanned by a scanning beam, of a film which moves in jerks picture by picture and is projected on said photo-electric surface, each picture of the film being scanned a plurality of times, and the projection of the film on the photo-electric surface being stopped during each movement of the film, said method consisting in again stopping the projection of the film on the photo-electric surface for a time equal to the previous stoppage and such a number of times that the beginnings of two successive stoppages are separated by the duration of a scanning of the photo-electric surface, and continuously scanning the screen while the film is projected and while it is obturated.

2. A device for scanning, in a television transmitter, a film moving in jerks picture by picture, and comprising a luminous source, a photo-electric surface formed by a group of photo-electric elements; means for directing the light issuing from the source through the film and for then projecting said light on said photo-electric surface, means for scanning several successive times and continuously each picture which is projected on said photo-electric surface, and a shutter provided with blades moving with a motion which is synchronous with that of the film and periodically cutting off the light issuing from the source as many times per picture as said picture is scanned, one of the cut-offs coinciding with the movement of the film, each scanning of the image being effected partly while the film is obturated and partly while it is projected onto said photo-electric surface.

3. A device for scanning, in a television transmitter, a film moving in jerks picture by picture, and comprising a luminous source, a photo-electric surface formed by a group of photo-electric elements; means for directing the light issuing from the source through the film and for then projecting said light on said photo-electric surface, means for scanning several successive times and continuously each picture which is projected on said photo-electric surface, a shutter provided with blades moving with a motion which is synchronous with that of the film and periodically cutting off the light issuing from the source as many times per picture as said picture is scanned, one of the cut-offs coinciding with the movement of the film, each scanning of the image being effected partly while the film is obturated and partly while it is projected onto said photo-electric surface, the shape of the shutter being such that the zones of the picture which are scanned during the projection of the picture onto the photo-electric surface are illuminated for a shorter time than the other zones, whereby a reproduction of uniform mean shade is obtained.

4. A device for scanning, in a television transmitter, a film moving in jerks picture by picture, and comprising a luminous source, a photo-electric surface formed by a group of photo-electric elements; means for directing the light issuing from the source through the film and for then projecting said light on said photo-electric surface, means for scanning several successive times and continuously each picture which is projected on said photo-electric surface, a shutter provided with blades moving with a motion which is synchronous with that of the film and periodically cutting off the light issuing from the source as many times per picture as said picture is scanned, one of the cut-offs coinciding with the movement of the film, each scanning of the image being effected partly while the film is obturated and partly while it is projected onto said photo-electric surface, and a filter of such opacity as to reduce the illumination of those zones of the picture which, are scanned during the projection of the picture onto the photo-electric surface whereby a reproduction of uniform mean shade is obtained.

5. A device for scanning, in a television transmitter, a film moving in jerks picture by picture, and comprising a luminous source, a photo-electric surface formed by a group of photo-electric elements; means for directing the light issuing from the source through the film and for then projecting said light on said photo-electric surface, means for scanning several successive times and continuously each picture which is projected on said photo-electric surface, a shutter provided with blades moving with a motion which is synchronous with that of the film and periodically cutting off the light issuing from the source as many times per picture as said picture is scanned, one of the cut-offs coinciding with the movement of the film, each scanning of the image being effected partly while the film is obturated and partly while it is projected onto said photo-electric surface, an amplifier for the scanning current of the photo-electric surface, and means for reducing the coefficient of amplification of said amplifier proportionally to the luminous flux received by the film, when said shutter permits the light issuing from said luminous source to reach the film whereby a reproduction of uniform mean shade is obtained.

6. A device for scanning, in a television transmitter, a film moving in jerks picture by picture, and comprising a luminous source, a photo-electric surface formed by a group of photo-electric elements; means for directing the light issuing from the source through the film and for then projecting said light on said photo-electric surface, means for scanning several successive times and continuously each picture which is projected on said photo-electric surface, a shutter provided with blades moving with a motion which is synchronous with that of the film and periodically cutting off the light issuing from the source as many times per picture as said picture is scanned, one of the cut-offs coinciding with the movement of the film, each scanning of the image being effected partly while the film is obturated and partly while it is projected onto said photo-electric surface, an amplifier for the scanning current of the photo-electric surface, a photo-electric cell, means inserted between said shutter and the film for sending on to said cell a quantity of light proportional to that received by the film, a resistance inserted in the circuit of the cell, and means for applying to a member of said amplifier, the difference of potential across the terminals of said resistance, whereby the coefficient of amplification of said amplifier is reduced when the light of the luminous source falls on the film and a reproduction of uniform mean shade is obtained.

RENÉ BARTHELEMY.